United States Patent
Howes et al.

(10) Patent No.: US 9,553,906 B2
(45) Date of Patent: Jan. 24, 2017

(54) METHOD AND SYSTEM FOR SYNCHRONIZATION OF DATA STREAMS

(71) Applicant: Aruba Networks, Inc., Sunnyvale, CA (US)

(72) Inventors: Richard Howes, Santa Monica, CA (US); William Monte LeBlanc, Atlanta, GA (US)

(73) Assignee: Aruba Networks, Inc., Sunnyvale, CA (US)

( * ) Notice: Subject to any disclaimer, the term of this patent is extended or adjusted under 35 U.S.C. 154(b) by 500 days.

(21) Appl. No.: 13/779,486

(22) Filed: Feb. 27, 2013

(65) Prior Publication Data

US 2014/0244855 A1   Aug. 28, 2014

(51) Int. Cl.
  G06F 15/16    (2006.01)
  H04L 29/06    (2006.01)
  H04N 21/231   (2011.01)
  H04N 21/24    (2011.01)

(52) U.S. Cl.
  CPC ............ *H04L 65/60* (2013.01); *H04L 65/602* (2013.01); *H04L 65/80* (2013.01); *H04N 21/23106* (2013.01); *H04N 21/2401* (2013.01); *H04N 21/2402* (2013.01)

(58) Field of Classification Search
  USPC .................................. 709/231, 224; 714/748
  See application file for complete search history.

(56) References Cited

U.S. PATENT DOCUMENTS

| | | | |
|---|---|---|---|
| 7,925,771 B1 * | 4/2011 | Ping | H04L 65/4092 709/203 |
| 2013/0044803 A1 * | 2/2013 | Fisher et al. | 375/240.02 |
| 2013/0060480 A1 * | 3/2013 | Korhonen | A61B 5/1118 702/19 |
| 2013/0166982 A1 * | 6/2013 | Zheng et al. | 714/748 |
| 2013/0329809 A1 * | 12/2013 | Leontaris et al. | 375/240.25 |

FOREIGN PATENT DOCUMENTS

EP         1130921 A1 *  9/2001

* cited by examiner

*Primary Examiner* — David Lazaro
*Assistant Examiner* — Marie Georges Henry
(74) *Attorney, Agent, or Firm* — Brooks, Cameron & Huebsch, PLLC (57) ABSTRACT

A method includes: while streaming video frames on a network toward a client device, detecting a loss of connectivity between the network and the client device; responsive to detecting the loss of the connectivity between the network and the client device, ceasing the streaming of the video frames toward the client device; subsequent to detecting the loss of connectivity, determining that the connectivity between the network and the client device has been re-established; responsive to determining that the connectivity between the network and the client device has been re-established, resuming the streaming of the video frames on the network toward the client device by transmitting an Instantaneous Decoder Refresh (IDR) frame on the network toward the client device without sending one or more frames corresponding to images chronologically prior to an image corresponding to the IDR frame.

25 Claims, 5 Drawing Sheets

METHOD AND SYSTEM FOR SYNCHRONIZATION OF DATA STREAMS

TECHNICAL FIELD

The present disclosure relates to synchronization of data streams. In one example, the present disclosure relates to resynchronization of digital video streams that are streamed to a client device after an interruption in connectivity between a network and the client device.

BACKGROUND

Compression of digital video data is used for many applications including transmission over bandwidth constrained channels, such as direct broadcast satellite, a controller to an access point, an access point to a client device, and storage on optical media. In order to achieve efficient compression, complex, computationally intensive processes are used for encoding (compressing) and decoding (decompressing) video. For example, MPEG-2 (Moving Pictures Expert Group, International organization for Standards, Geneva, Switzerland) is known as an efficient method for compressing video.

Most modern digital video compression schemes, like H.264 ("Advanced Video Coding", International Telecommunication Union Telecommunication Standardization Sector, Geneva, Switzerland), employ the concept of encoding a video stream as a set of intra-coded frames (referred to herein as "I-frames") and predictive frames (referred to herein as "P-frames"). I-frames include still pictures with image information. I-frames may be used as reference frames for P-frames. For example, P-frames may include information referring to one or more I-frames and indicate differences from the one or more I-frames. Furthermore, some P-frames may be used as reference frames for other P-frames. For example, a P-frame may include information referring to another P-frame and indicate differences from the other P-frame. A particular predictive frame that references to at least one frame to-be-displayed prior to that particular predictive frame and at least one frame to-be-displayed subsequent to that particular predictive frame may be referred to as a bi-predictive frame (referred to herein as "B-Frames").

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

General Overview

In one or more embodiments, while streaming video frames on a network toward a client device, a loss of connectivity between the network and the client device is detected. Responsive to detecting the loss of the connectivity between the network and the client device, the streaming of the video frames toward the client device is ceased. Subsequent to detecting the loss of connectivity, a determination is made that the connectivity between the network and the client device has been re-established. Responsive to determining that the connectivity between the network and the client device has been re-established, the streaming of the video frames on the network toward the client device is resumed by transmitting a particular frame of a particular type such that no frames, corresponding to images that are chronologically subsequent to an image corresponding to said particular frame, reference any frames corresponding to images that are chronologically prior to the image corresponding to said particular frame.

Architectural Overview

Figure 1:
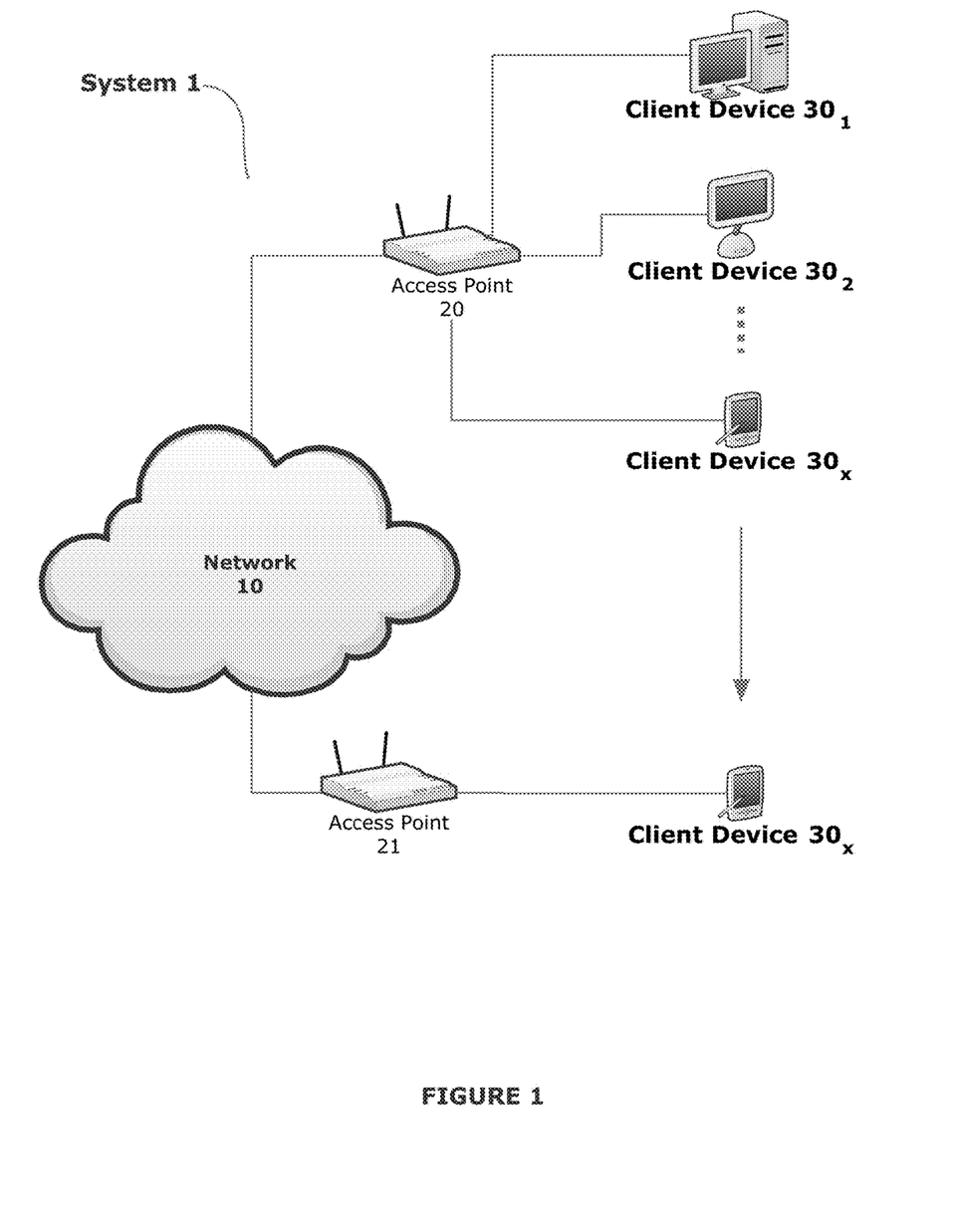
FIG. 1 shows a block diagram example of a system in accordance with one or more embodiments.

FIG. 1 shows a block diagram example of a system which includes digital devices in accordance with one or more embodiments. In one or more embodiments, System 1 may include more or less digital devices, than the devices illustrated in FIG. 1.

The term "digital device" generally refers to any hardware device that includes a processor. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant "PDA", a wireless receiver and/or transmitter, an access point, a base station, a communication management device, a router, a switch, and/or a controller.

When the digital device is adapted for communications with a network, the digital device may be configured as a network device, a client device, or both. A "network device" is a digital device that may be configured to provide a network service. Examples of network devices include an access point configured to provide access to resources, a physical controller device, and any hardware device executing a virtual controller. A "client device" is a digital device that may be configured to receive a network service.

System 1, as illustrated in FIG. 1, is a system that includes a network 10 (for example, a Local Area Network, a Wide Area Network, the Internet, Intranet, etc.), an access point 20, an access point 21, and a set of client devices $30_1$-$30_x$.

In an embodiment, the client devices $30_1$-$30_x$ are digital devices that include a processor, memory, and input/output (I/O) interfaces including a wireless interface such as an IEEE 802.11 wireless interface. The wireless interface may be used to communicate with the access point 20 to obtain access to devices and/or resources within System 1. The client devices $30_1$-$30_x$ may be wireless electronic devices that are capable of receiving voice data streams, video data streams, or any other type of data. Examples of client devices include personal computers, laptop computers, netbook computers, wireless music players, portable telephone communications devices, smart phones, tablets, and digital televisions.

Access point 20 and access point 21 are communicatively coupled to the network 10 via a transmission medium to send and receive data. The data may include, for example, video data. The transmission medium may be a wired or a wireless medium. Access point 20 and access point 21 may be on a same network or different networks. Access point 20 and access point 21 may be on the same Internet Protocol Subnet or different Internet Protocol Subnets. In an example, System 1 may include one or more controllers (not shown) which are configured to communicate with one or more access points (for example, access point 20 and access point 21) within System 1. The controller links one or both access point 20 and access point 21 to network 10. Alternatively, two separate controllers link access point 20 and access point 21 to network 10.

In one or more embodiments, access point 20 and access point 21 each correspond to a network device such as a wired access port, a wireless access port, a switch, a router, or any combination thereof. An access point communicatively couples a client device to one or more other devices and/or resources within System 1. The access point 20 is configured to forward data to or from the client devices $30_1$-$30_n$.

In one example, a controller, that is communicatively coupled to access point 20, receives a video stream including a plurality of video frames based on a subscription for the video stream requested by client device $30_x$. The controller streams the video frames to access point 20. Access point 20 streams the video frames to client device $30_x$.

In an embodiment, a set of digital devices within System 1 (for example, digital devices within Network 10) correspond to nodes within a distributed set of nodes. In an example, access point 20 and access point 21 are both nodes that store information related to client devices within System 1. In another example, access point 20 is connected to a node (for example, a controller) while access point 20 is not itself a node storing information related to client devices. In an example, the nodes are designated data repositories that are communicatively coupled to access points within System 1. Various combinations of devices within System 1 may be used as nodes for storing data.

The information associated with a client device includes any of:
  a. Authentication Information—Information related to, used in, or generated during prior authentications of the client device.
  b. Multicast Information—Information related to multicasts received by the client device.
  c. Subscription Information—Information related to video streams or data streams received by the client device.
  d. Optimization Information—Information related to the configuration of the client device or configuration of access points in communication with the client device for optimal performance.
  e. Encryption Key Information—Information related to encryption keys used for encrypting data received by the client device or data sent by the client device.
  f. Firewall Session Information—Information related to a firewall session defining acceptable data sources or data types for the client device.
  g. Gateway Information—Dynamic Host Configuration Protocol (DHCP) parameters used for an access point when communicatively coupling the client device to one or more resources on a network.
  h. Fast Roaming Information—Keys for Opportunistic Key Caching (OKC) as defined under IEEE 802.11

Network Devices

Figure 2:
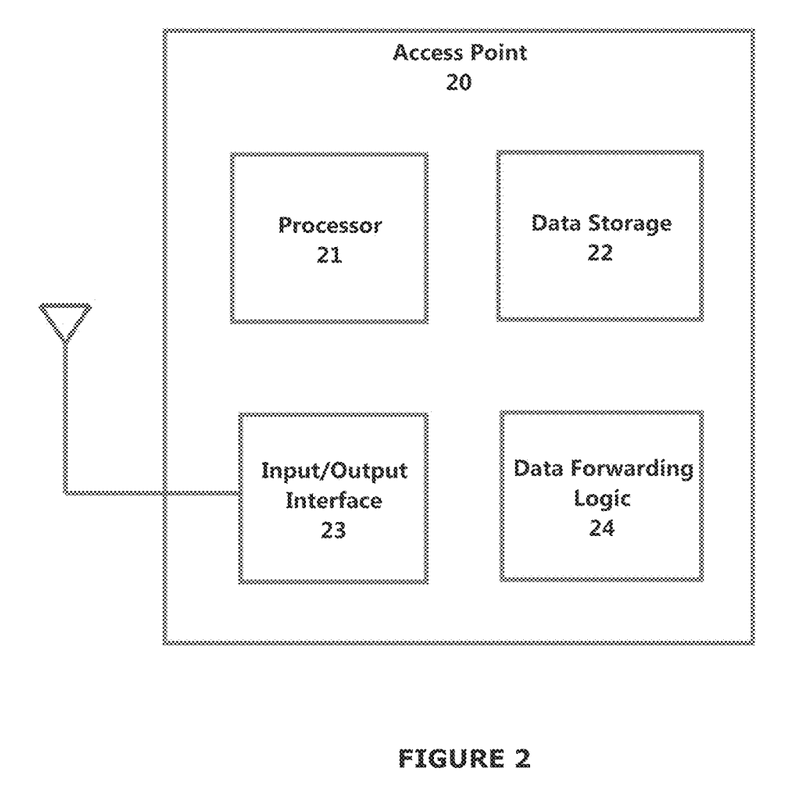
FIG. 2 shows a block diagram example of an access point in accordance with one or more embodiments.

FIG. 2 shows a block diagram example of access point 20 in accordance with one or more embodiments. One or more steps described herein as being performed by an access point, may be performed by another network device such as another access point, or a controller. Furthermore, one or more components described herein as being implemented within an access point may be implemented within another network device such as a controller. Other access points within System 1 may be configured similarly or differently than access point 20. Access point 20 is a network device that comprises one or more of: a processor 21, data storage 22, an I/O interface 23, and a data forwarding logic 24.

The data storage 22 of the access point 20 may include a fast read-write memory for storing programs and data during the access point 20's operations and a hierarchy of persistent memory such as ROM, EPROM, and Flash memory for storing instructions and data needed for the startup and/or operations of access point 20. The data storage 22 stores data that is to be transmitted from the access point 20 or data that is received by access point 20. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi™ interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, the data forwarding logic 24 includes one or more functional units implemented using firmware, hardware, software, or a combination thereof for selectively caching, storing, and forwarding data (including video frames) to client devices. Although, the data forwarding logic 24 is shown as implemented on access point 20, one or more physical or functional components of the data forwarding logic 24 may be implemented on a separate device. For example, the data forwarding logic 24 may be implemented on a controller in communication with an access point with which a client device is associated. The individual functional components of the data forwarding logic 24 are described below with reference to FIG. 3.

Data Forwarding Logic

Figure 3:
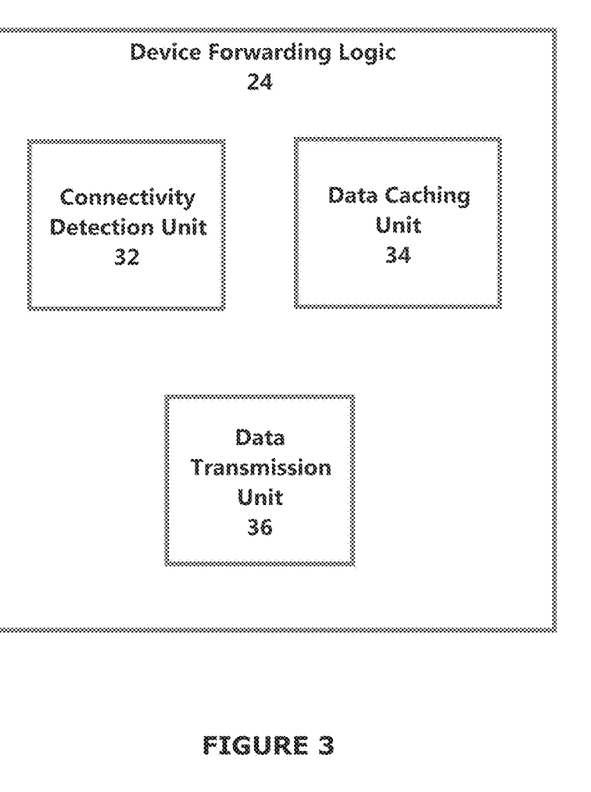
FIG. 3 illustrates an example of a data forwarding logic in accordance with one or more embodiments.

FIG. 3 illustrates an example of data forwarding logic 24 in accordance with one or more embodiments. In one or more embodiments, the data forwarding logic 24 is implemented with functional units including a connectivity detection unit 32, a data caching unit 34, and a data transmission unit 36. Components and functionalities described with reference to a particular functional unit may instead be implemented within another functional unit. Furthermore, two or more functional units may be combined into a single program or single device. A single functional unit may be implemented as multiple devices or multiple applications that each performs a portion of the functions described herein.

In an embodiment, the connectivity detection unit 32 includes functionality to detect connectivity with a client device (e.g., client device $30_x$); for example, that connectivity has been lost and/or that connectivity has been re-established. The connectivity detection unit 32 may include functionality to monitor communications received from a client device or detect a lack of communications from the client device.

In an embodiment, a data caching unit 34 includes functionality for caching data to-be transmitted on a network toward a client device. In an embodiment, the data caching unit 34 includes functionality to selectively cache data for transmission toward a client device. The data caching unit 34 stores a subset of received video frames for transmission to a client device while dropping other received video frames.

In an embodiment, the data transmission unit 36 selects data for transmitting on a network toward a client device. The data transmission unit 36 transmits received video frames toward a client device. The data transmission unit 36 ceases transmission of video frames on a network toward a client device in response to determining that connectivity with the client device has been terminated. The data transmission unit 36 resumes transmission of video frames on a network toward a client device in response to determining that connectivity with the client device has been re-established.

Figure 4:
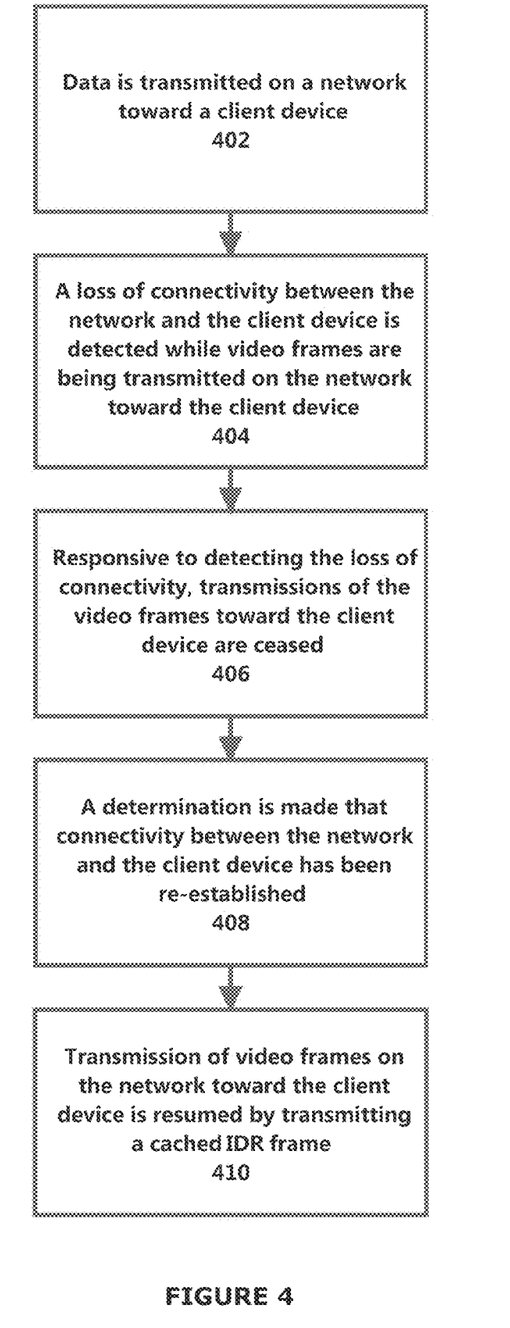
FIG. 4 illustrates an example method for transmitting data on a network toward a client device.

Streaming Video Frames Toward a Client Device after an Interruption in Connectivity Between a Network and the Client Device FIG. 4 illustrates an example method for streaming video frames toward a client device. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, data is transmitted on a network toward a client device (Operation 402). Transmitting data on a network toward a client device includes transmitting data directly to the client device (for example, an access point transmitting data to a client device) or transmitting data to an intermediate device on a path to a client device (for example, a controller transmitting data to an access point with which the client device is associated).

In an embodiment, a loss of connectivity between a network and a client device is detected while video frames are being transmitted on a network toward the client device (Operation 404). In an example, the loss of connectivity is detected based on determining that the client device has failed to acknowledge frames transmitted by an access point (or other device) to the client device. In another example, signal strength of signals received from a client device are compared against a threshold value. If the signal strength for x number of signals is below the threshold value, connectivity with the client device is determined to be lost or the connectivity is intentionally terminated. In an example, when access point 20 terminates connectivity with client device $30_x$ due to low signal strength of received signals, client device $30_x$ associates with a more suitable access point such as access point 21 (e.g., for load balancing purposes, for better signal strength with another access point closer to the client device than access point 20, or for any other purpose). In another example, the loss of connectivity between a network and a client device is detected by a controller based on a message, indicating loss of connectivity, which is received from an access point with which the client device was associated.

In an embodiment, responsive to detecting the loss of connectivity, transmissions of the video frames toward the client device are ceased (Operation 406). In an example, an access point stops transmitting a multicast video stream when connectivity with all subscribing client devices are lost. In another example, a controller stops transmitting video frames to an access point that was forwarding the video frames to a client device with which connectivity has been lost. Ceasing transmission of video frames when connectivity with a receiving client device is lost advantageously reduces wireless traffic and waste of resources.

In an embodiment, a particular frame of a particular type is cached for transmission to a client device prior to re-establishment of connectivity between the network and the client device, such that no frames, corresponding to images that are chronologically subsequent to an image corresponding to that particular frame, reference any frames corresponding to images that are chronologically prior to the image corresponding to the particular frame. (Step 406). Examples of frames of the particular type, as described above, include Instantaneous Decoder Refresh (IDR) frames, key frames, or Random Access Point frames. Example embodiments and/or figures described herein refer to IDR frames for purposes of clarity, however, the example embodiments are applicable to any frames of the particular type described above.

In an embodiment, the data caching unit 34 includes functionality to selectively cache data for transmission toward a client device. The data caching unit 34 stores a subset of received video frames for transmission to a client device while dropping other received video frames.

In an example, the data caching unit 34 stores a last-received IDR frame and frames corresponding to images chronologically subsequent to an image corresponding to the IDR frame. The data caching unit 34 drops or overwrite frames that correspond to images chronologically prior to the image corresponding to the IDR frame. Whenever a new IDR frame is received (and is now the last-received IDR frame), the data caching unit 34 deletes or overwrites the previously stored IDR frame and any frames received prior to the last-received IDR frame.

A first image is referred to herein as chronologically subsequent to a second image when the first image is intended to-be displayed subsequent to the second image. For example, images that form a movie are chronologically ordered in a particular manner intended by a producer of the movie. In an embodiment, each frame is associated with a sequence number based on the chronological order of corresponding images. A data caching unit 34 caches an IDR frame and frames with sequence numbers subsequent to the IDR frame while dropping frames with sequence numbers prior to the IDR frame.

In another example, the data caching unit 34 requests an IDR frame for a set of video frames responsive to determining that a client device subscribing to the video frames has lost connectivity with the network.

In an embodiment, the data caching unit 34 selectively determines whether to request an IDR frame, responsive to determining that connectivity with a client device subscribing to a video stream has been lost, based on an expected time until the next periodic IDR frame and an expected time until connectivity with the client device is re-established. In an example, when connectivity with a client device is intentionally terminated due to a low signal strength so that the client device may re-associate with another more suitable access point on the network, the amount of time between termination of the connectivity and re-establishing the connectivity is known (for example, set by an administrator or determined based on prior statistics). When an IDR frame is periodically received every x seconds, the number of seconds till the next IDR frame is computed by subtracting a number of seconds since the last IDR frame was received from x seconds. If the number of seconds until the next IDR frame is less than the determined time period until connectivity with a client device is re-established, then the data caching unit 34 does not request an IDR frame. If the number of seconds until the next IDR frame is greater than the determined time period until connectivity with a client device is re-established then an IDR frame is requested by the data caching unit 34.

In an embodiment, a determination is made that connectivity between a network and a client device has been re-established (Operation 408). In an example, the connectivity detection unit 32 may determine that the client device has reestablished connectivity with a network by associating with a same access point with which it was previously associated. In another example, the connectivity detection unit 32 may determine that the client device has reestablished connectivity with a network by associating with a different access point on the network than an access point with which the client device was previously associated. Reestablishing connectivity with a network may refer to a client device associating with an access point on the network. Reestablishing connectivity may include the client device requesting authentication and in addition being authenticated by an authentication server (e.g., a RADIUS server) on the network.

In an embodiment, transmission of video frames on the network toward the client device is resumed by transmitting a cached IDR frame (Operation 410). The cached IDR frame may be transmitted without transmitting one or more frames corresponding to images chronologically prior to an image corresponding to the IDR frame. In an example, the data transmission unit 36 resumes transmission of video frames on a network toward a client device in response to determining that connectivity between the client device and the network has been re-established. The data transmission unit 36 resumes transmission of the video frames starting with an IDR frame cached by the data caching unit 34. In an example, the data transmission unit 36 resumes transmission of the video frames starting with the last-received IDR frame or an IDR frame requested by the data caching unit 34.

In an embodiment, a controller determines that a client device has associated with a second access point different than a first access point with which the client device was previously associated. After ceasing to forward video frames toward the client device via the first access point in response to detecting that connectivity with the client device via the first access point was lost, the controller resumes forwarding video frames toward the client device via the second access point with which the client device is now associated. In this example, the client device has roamed from the first access point to the second access point. As a result of roaming from the first access point to the second access point, a controller has ceased transmitting video frames toward the client device via the first access point and resumed transmitting video frames toward the client device via the second access point.

Resuming the transmission of video frames starting with the IDR frame is advantageous because a client device may not necessarily be able to decode frames prior to the IDR frame. The frames prior to IDR frame may refer back to other frames which are not being transmitted to the client device. By skipping transmission of video frames prior to the IDR frame, wireless channel usage is reduced and the client device does not use any resources attempting to decode frames which the client device may ultimately not be able to decode successfully. A client device receiving a stream of video frames starting with an IDR frame may immediately be able to display a corresponding video without delays caused by non-decodable frames.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
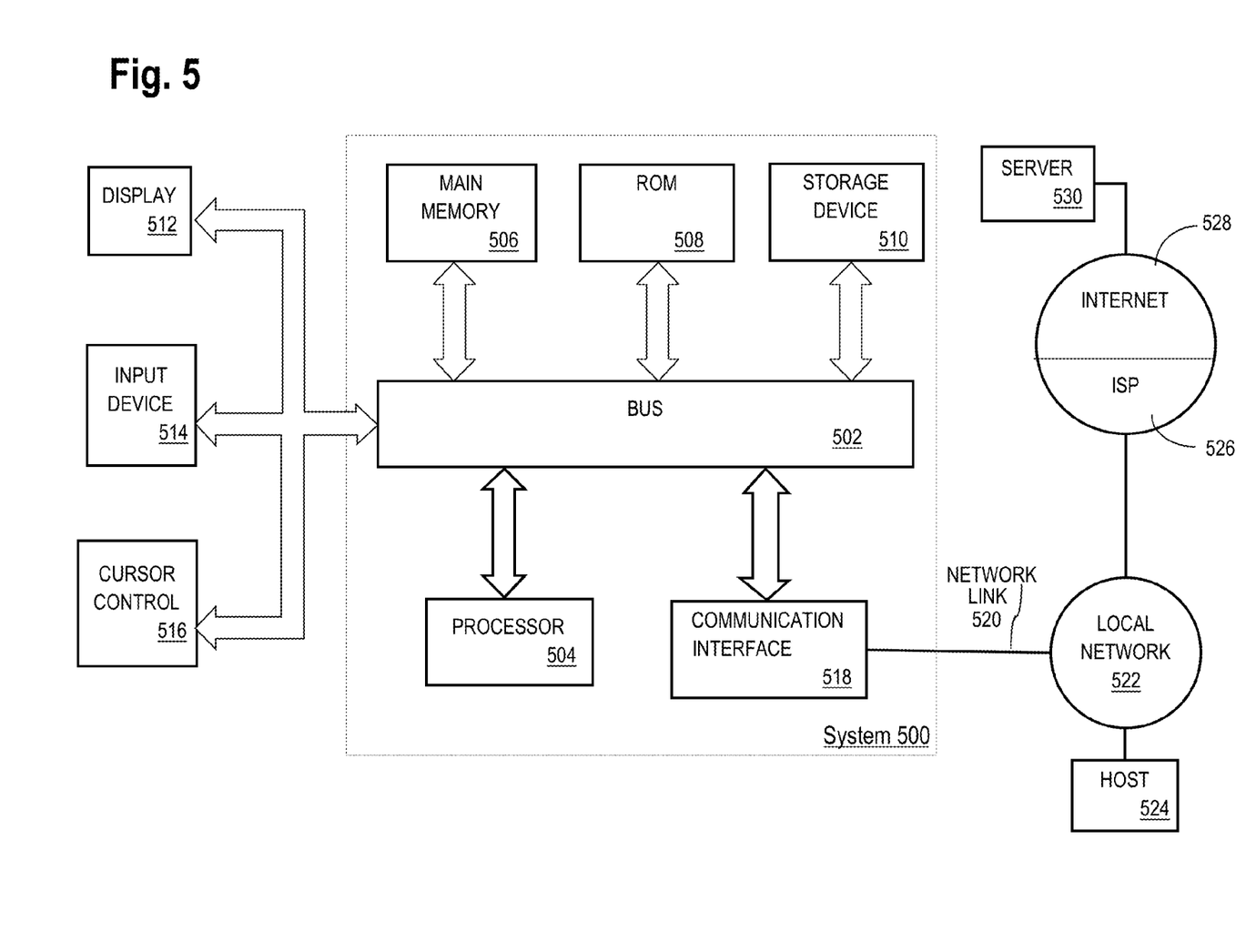
FIG. 5 illustrates an example system configured for performing operations described herein.

For example, FIG. 5 is a block diagram that illustrates a System 500 upon which an embodiment of the invention may be implemented. System 500 includes a bus 502 or other communication mechanism for communicating information, and a hardware processor 504 coupled with bus 502 for processing information. Hardware processor 504 may be, for example, a general purpose microprocessor.

System 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render System 500 into a special-purpose machine that is customized to perform the operations specified in the instructions.

System 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

System 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

System 500 may implement the techniques described herein using customized hard-wired logic, one or more ASICs or FPGAs, firmware and/or program logic which in combination with the computer system causes or programs System 500 to be a special-purpose machine. According to one embodiment, the techniques herein are performed by System 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to System 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

System 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from System 500, are example forms of transmission media.

System 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause the one or more hardware processors to:

while streaming frames via a first access point associated with a network toward a client device, detect, by a controller in communication with the first access point and a second access point, a loss of connectivity between the network and the client device;

responsive to detecting the loss of the connectivity between the network and the client device, cause the controller to:

store a last-received frame from a set of frames of a particular type; and cease the streaming of frames toward the client device;

subsequent to detecting the loss of connectivity, determine, by the controller, that a connectivity between the second access point associated with the network and the client device has been established;

responsive to determining that the connectivity between the second access point associated with the network and the client device has been established, cause the controller to:

select a particular frame for resuming the streaming of the frames such that no frames corresponding to images that are chronologically subsequent to a particular image corresponding to any frame of the particular type reference any frames corresponding to images that are chronologically prior to the particular image; and resume the streaming of the frames via the second access point associated with the network toward the client device by transmitting the particular frame on the network toward the client device without sending one or more frames corresponding to images chronologically prior to an image corresponding to the particular frame.

2. The medium of claim 1, wherein streaming the frames on the network toward a client device comprises a particular access point streaming the frames to the client device, the client device being associated with the particular access point.

3. The medium of claim 1, wherein streaming the frames on the network toward the client device comprises a network device streaming the frames to a particular access point, the client device being associated with the particular access point.

4. The medium of claim 1, wherein the instructions are further to cause the one or more hardware processors to: subsequent to detecting, by the controller, the loss of connectivity and prior to determining, by the controller, that the connectivity between the second access point and the network has been established, select or obtain the particular frame for resuming the streaming of the frames after the connectivity between the second access point and the network has been established.

5. The medium of claim 1, wherein the instructions are further to cause the one or more hardware processors to: subsequent to detecting, by the controller, the loss of connectivity and prior to determining that the connectivity between the second access point and the network has been established, select or obtain a plurality of frames for resuming the streaming of the frames after the connectivity between the second access point and the network has been established.

6. The medium of claim 1, wherein the instructions are further to cause the one or more hardware processors to: responsive to detecting, by the controller, the loss of the connectivity between the network and the client device, request the particular frame from a source of the frames.

7. The medium of claim 1, wherein the instructions are further to cause the one or more hardware processors to: responsive to detecting the loss of the connectivity between the network and the client device:
store the last-received frame from a set of frames of the particular type subsequent to detecting the loss of connectivity and prior to determining that the connectivity between the second access point and the network has been established.

8. The medium of claim 1, wherein instructions are further to cause the one or more hardware processors to: store frames corresponding to images chronologically subsequent to an image corresponding to the last-received frame.

9. The medium of claim 1, wherein the instructions are further to cause the one or more hardware processors to: replace the last-received frame each time a new frame of the particular type is received during a time period subsequent to detecting the loss of connectivity and prior to determining that the connectivity between the second access point and the network has been established.

10. The medium of claim 1, wherein to detect the loss of connectivity between the network and the client device, the instructions are further to cause the one or more hardware processors to determine, by the controller, that the client device is not responsive to communication for a particular period of time or that a signal strength of wireless signals received from the client device are below a particular threshold.

11. The medium of claim 1, wherein to detect the loss of the connectivity between the network and the client device, the instructions are further to cause the one or more hardware processors to detect, by the controller, a loss of connectivity between a particular access point and the client device, and wherein to determine that the connectivity between the network and the client device has been reestablished, the instructions are further to cause the one or more hardware processors to determine, by the controller, that the client device has re-established a connection with the particular access point.

12. The medium of claim 1, wherein the particular frame is an Instantaneous Decoder Refresh (IDR) frame.

13. A system comprising:
one or more hardware processors;
a memory on which is stored instructions that are to cause the one or more hardware processors to:
while streaming frames via a first access point associated with a network toward a client device, detect a loss of connectivity between the network and the client device;
responsive to detecting the loss of the connectivity between the network and the client device:
store a last-received frame from a set of frames of a particular type; and
cease the streaming of the frames toward the client device;
subsequent to detecting the loss of connectivity, determine that a connectivity between a second access point associated with the network and the client device has been established;
responsive to determining that the connectivity between the second access point associated with the network and the client device has been established:
select a particular frame for resuming the streaming of the frames such that no frames corresponding to images that are chronologically subsequent to a particular image corresponding to any frame of the particular type reference any frames corresponding to images that are chronologically prior to the particular image; and
resume the streaming of the frames via the second access point associated with the network toward the client device by transmitting the particular frame on the network toward the client device without sending one or more frames corresponding to images chronologically prior to an image corresponding to the particular frame.

14. The system of claim 13, wherein the system comprises an access point and wherein streaming the frames on the network toward a client device comprises the access point streaming the frames to the client device, the client device being associated with the access point.

15. The system of claim 13, wherein the system comprises a network device and wherein streaming the frames on the network toward the client device comprises the network device streaming the frames to a particular access point, the client device being associated with the particular access point.

16. The system of claim 13, wherein the instructions are further to cause the one or more hardware processors to: subsequent to detecting the loss of connectivity and prior to determining that the connectivity between the second access point and the network has been established, select or obtain the particular frame for resuming the streaming of the frames after the connectivity between the second access point and the network has been established.

17. The system of claim 13, wherein the instructions are further to cause the one or more hardware processors to: subsequent to detecting the loss of connectivity and prior to determining that the connectivity between the second access point and the network has been established, select or obtain a plurality of frames for resuming the streaming of the frames after the connectivity between the second access point and the network has been established.

18. The system of claim 13, wherein the instructions are further to cause the one or more hardware processors to: responsive to detecting the loss of the connectivity between the network and the client device, request the particular frame from a source of the frames.

19. The system of claim 13, wherein the instructions are further to cause the one or more hardware processors to: responsive to detecting the loss of the connectivity between the network and the client device:
store the last-received frame from the set of frames of the particular type subsequent to detecting the loss of connectivity and prior to determining that the connectivity between the second access point and the network has been established.

20. The system of claim 13, wherein the instructions are further to cause the one or more hardware processors to store frames corresponding to images chronologically subsequent to an image corresponding to the last-received frame.

21. The system of claim 13, wherein the instructions are further to cause the one or more hardware processors to replace the last-received frame each time a new frame of the particular type is received during a time period subsequent to detecting the loss of connectivity and prior to determining that the connectivity between the second access point and the network has been established.

22. The system of claim 13, wherein to detect the loss of connectivity between the network and the client device, the instructions are further to cause the one or more hardware processors to determine that the client device is not responsive to communication for a particular period of time or that a signal strength of wireless signals received from the client device are below a particular threshold.

23. The system of claim 13, wherein to detect the loss of the connectivity between the network and the client device, the instructions are further to cause the one or more hardware processors to detect a loss of connectivity between a particular access point and the client device, and wherein to determine that the connectivity between the network and the client device has been reestablished, the instructions are further to cause the one or more hardware processors to determine that the client device has re-established a connection with the particular access point.

24. The system of claim 13, wherein to detect the loss of the connectivity between the network and the client device, the instructions are further to cause the one or more hardware processors to detect a loss of connectivity between the client device and a first access point on the network, and wherein to determine that a connectivity between the network and the client device has been reestablished, instructions are further to cause the one or more hardware processors to determine that the client device has re-established a connection with the network via a second access point different than the first access point.

25. The system of claim 13, wherein the particular frame is an Instantaneous Decoder Refresh (IDR) frame.

* * * * *